J. J. TATUM.
SAFETY HANGER FOR BRAKE RODS.
APPLICATION FILED FEB. 14, 1918.
1,373,575.
Patented Apr. 5, 1921.
2 SHEETS—SHEET 1.
Fig.1.
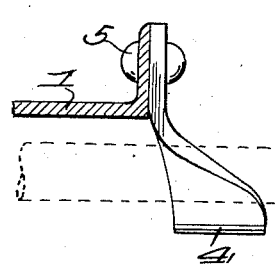
Fig.2.
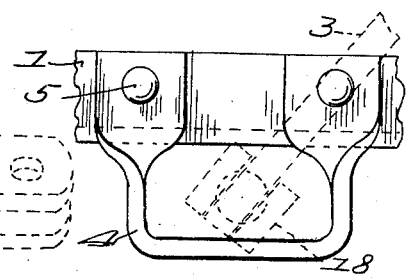
Fig.3.
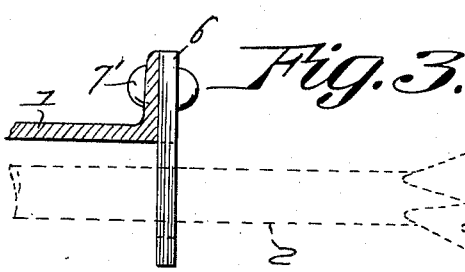
Fig.4.
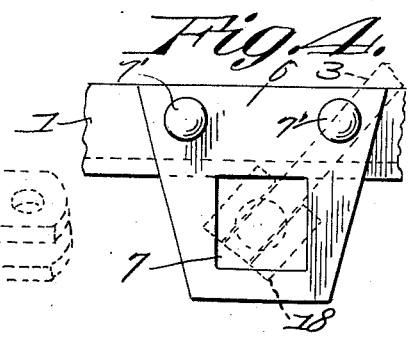
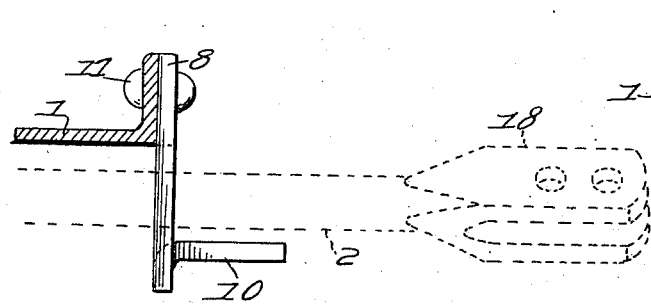
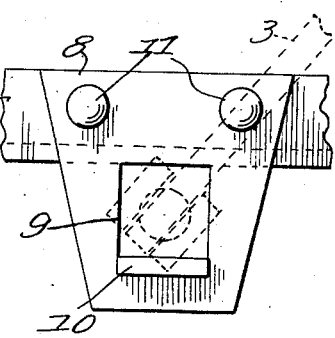
Fig.5. Fig.6.
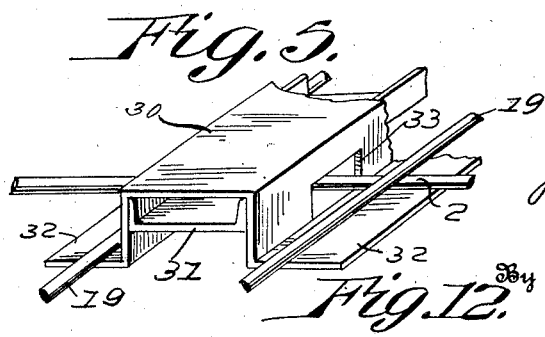
Fig.12.
Inventor
John J. Tatum
By Edwin A. Clarkson
his Attorney

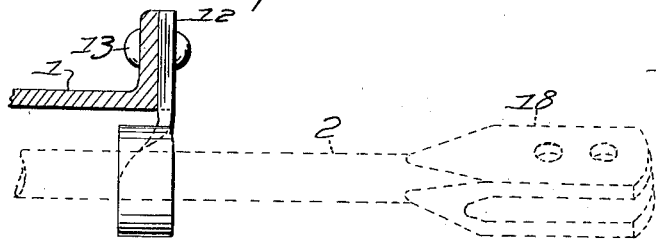
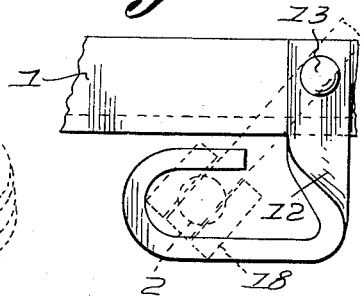
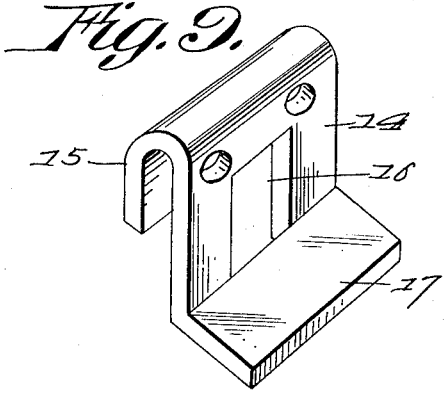
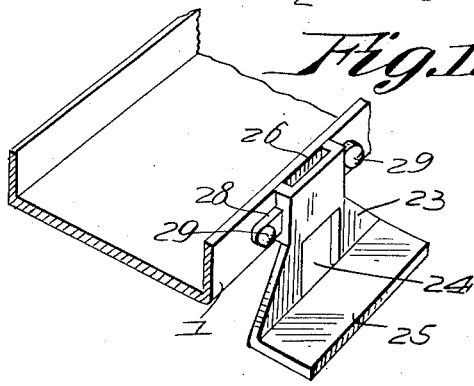
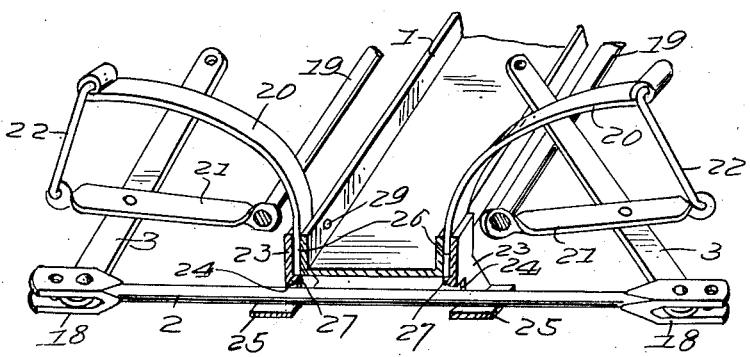

UNITED STATES PATENT OFFICE.

JOHN J. TATUM, OF BALTIMORE, MARYLAND.

SAFETY-HANGER FOR BRAKE-RODS.

1,373,575.　　　　　Specification of Letters Patent.　　Patented Apr. 5, 1921.

Application filed February 14, 1918. Serial No. 217,127.

*To all whom it may concern:*

Be it known that I, JOHN J. TATUM, a citizen of the United States, residing at the city of Baltimore, in the State of Maryland, have invented certain new and useful Improvements in Safety-Hangers for Brake-Rods, of which the following is a specification.

It has been my experience that the lower brake rod of car trucks becomes disengaged from the brake levers, due to the pins working out of position after the rod and the levers of the brake rigging are connected together, allowing the brake rod and beam to fall down upon the road bed, and catching in the cross ties or tracks which results in derailment and wrecks, doing damage to both the rolling stock and road bed. These accidents are so serious at times that they cause loss of life and limb to train men, and at times cause wrecks of passenger trains and injury and loss of life to passengers.

The object of my invention is to provide a safety hanger for the lower brake rod and brake beam and other parts of the brake rigging which will prevent the rod and brake beam from falling on the track should the pin or other part be lost or broken. A further object of my invention is to provide a safety hanger for brake rigging whereby should the brake rigging become disengaged from the truck, the brake beam or levers cannot fall any lower than the lower rod is permitted to drop into the safety hanger; and with these and other objects in view my invention consists of the parts and combination of parts as will be hereinafter set forth.

In the drawings—

Figure 1 is a side elevation of a brake hanger secured to the spring beam of the truck, said beam being in section, and the lower brake rod being shown in dotted lines.

Fig. 2 is a front elevation of the hanger, the brake rod and lever being shown in dotted lines.

Fig. 3 is a side elevation of another embodiment of my invention.

Fig. 4 is a front elevation of Fig. 3.

Fig. 5 is a side elevation of still another embodiment of my invention.

Fig. 6 is a front elevation of Fig. 5.

Fig. 7 is an end elevation of still another embodiment of my invention.

Fig. 8 is a front elevation of Fig. 7.

Fig. 9 is a perspective view of another embodiment of my brake rod hanger. Figs. 10, 11 and 12 show still further embodiments of my invention.

The reference numeral 1 designates the usual spring beam of a car truck and 2 the usual lower brake rod to which is connected the truck lever 3.

The safety brake hanger 4 shown in Figs. 1 and 2 consists of a substantially U shaped strap which is detachably connected to the spring beam by means of a suitable fastening device 5.

In Figs. 3 and 4 the safety hanger for a brake rod comprises a flat metal plate 6 through which an opening 7 is formed, through which opening the brake rod is adapted to pass, the upper end of the hanger 6 is secured to the spring beam by means of a suitable fastening 7'.

The brake rod hanger 8 shown in Figs. 5 and 6 is plate metal having an opening 9 through which the brake rod is adapted to pass, the metal punched from the plate for the purpose of forming the opening being bent at right angles to the plate and constitutes an elongated bearing 10 for the brake rod as more clearly shown in Fig. 5.

This hanger is secured to a spring beam by means of a suitable fastening 11 which may be rivets or bolts.

The brake rod hanger shown in Figs. 7 and 8 comprises a vertical member 12 which is secured by a suitable fastening 13 to a spring beam 1, the lower portion of said strap 12 being deflected to one side thence upwardly and thence inwardly toward the vertical member 12 whereby a bearing is formed to hold the brake rod and brake beam from falling to the track, the lower bent portion of the hanger being disposed substantially under the spring beam. The extreme free end of the hanger 12 is so positioned relatively to the under face of the spring beam that the brake rod 2 cannot move transversely off of the hanger strap.

In Fig. 9 I show still another embodiment of my invention, in which the brake rod hanger comprises a vertical member 14 provided at its top with a rearwardly and downwardly turned flange 15 from the body 14, said flange constituting a hook adapted to fit over the flange of the spring beam to which it may be secured by means of bolts, rivets and the like. The vertical member 14 is provided with an opening 16 for the passage of the lower brake rod. At the bottom of the vertical member 14 in Fig. 9 I provide a flange 17 extending at right angles thereto, which flange acts as an extended bearing or rest for the brake fulcrum bar or bottom rod and brake beam, in the event that any part of the brake rigging gets loose from its fastening.

The opening or bearing through the hanger strap is designed to be large enough to allow the jaws 18 of the lower brake rod to pass through so that it may be removed at will without removing the safety hanger strap.

From the above it will be seen that I have provided a combined safety hanger for the lower brake rod brake beam and associated parts of a brake rigging which will prevent the rod brake beam and parts from falling to the road bed in the event of the loosening or breaking of a connecting pin, or from any other break in the rigging.

My improved brake hanger is in extensive use and has been found to be an effective improvement to prevent the falling of the lower brake rod brake beam and other parts of the brake rigging.

In Figs. 10 and 11 I show another embodiment of my invention wherein the rod hanger is shown as a combined rod hanger and holder for the brake beam suspension spring.

In Figs. 10 and 11, 19 designates the brake beam, 20 the brake beam suspension spring, 21 the fulcrum and 22 the link connecting the fulcrum and spring.

The hanger 23 is provided with the opening 24 for the passage of connecting rod 2 and has a bottom flange 25. A pocket or recess 26 is formed in the top of the hanger 23 which is adapted to receive and hold the inner end of the brake beam suspension spring 20 and at the bottom of the recess or pocket I provide a stop or abutment 27 to limit the downward movement of the spring in said pocket or recess. Lugs 28 extend from the hanger through which rivets 29 pass to secure the combined hanger and brake beam suspension spring holder to the spring plank. Flanges 25 form a holding part for the lower brake rod or fulcrum bar or brake beam should they get loose from their fastenings, keeping them from falling on the track or road bed.

In Fig. 12 I have shown another embodiment wherein 30 represents a substantially U shaped combined safety strap adapted to be fixed to the spring beam 31; said strap being provided with laterally extending flanges 32 which are adapted to catch the brake beams, connecting rod, and fulcrum bar, and prevent them from falling to the track or road bed. The side members of the strap are provided with openings 33 through which the connecting rod 2 may pass as described in connection with the other figures of the drawing.

What I claim is:

1. A safety hanger for brake rigging secured to a part of a truck, and having a bearing near its lower end for the brake rod, to embrace the lower brake rod and hold it therein against accidental displacement under service conditions.

2. In a railroad car truck the combination with a spring plank, and upwardly extending flanges on said plank, of a safety hanger hung from one of said flanges, at its upper end with its lower end depending below said plank and supporting the bottom brake rod of a brake rigging against falling to the track.

3. In a railroad car truck the combination with a spring plank, of a safety hanger secured to said plank at its upper end and depending below said plank and a supporting member on the lower end portion of the hanger for supporting the lower brake rod against falling to the track.

4. In a railroad car truck the combination with a spring plank having upturned side marginal flanges, of a safety hanger secured at its upper end to one of said flanges and depending below the said plank, and acting as a support to embrace the lower brake rod of a brake rigging and support the same against falling to the track.

5. In a railroad car truck, the combination with the spring plank having side marginal upstanding flanges, of a safety hanger having an inverted U shaped upper end adapted to fit over one of the flanges of the spring plank and having its lower end depending below the plank and provided with an opening through which the bottom brake rod passes and in which it is supported against accidental displacement.

JOHN J. TATUM.